United States Patent
Hotto

(10) Patent No.: US 9,840,413 B2
(45) Date of Patent: Dec. 12, 2017

(54) INTEGRATED REFORMER AND SYNGAS SEPARATOR

(71) Applicant: Energyield LLC, Carlsbad, CA (US)

(72) Inventor: Robert Hotto, Carlsbad, CA (US)

(73) Assignee: Energyield LLC, Carlsbad, CA (US)

( * ) Notice: Subject to any disclaimer, the term of this patent is extended or adjusted under 35 U.S.C. 154(b) by 123 days.

(21) Appl. No.: 14/715,026

(22) Filed: May 18, 2015

(65) Prior Publication Data

US 2016/0344051 A1    Nov. 24, 2016

(51) Int. Cl.
| | | |
|---|---|---|
| C01B 3/38 | (2006.01) | |
| B01J 19/24 | (2006.01) | |
| F02C 6/18 | (2006.01) | |
| F02C 3/22 | (2006.01) | |
| H01M 8/0612 | (2016.01) | |
| C01B 3/50 | (2006.01) | |

(52) U.S. Cl.
CPC ............ *C01B 3/38* (2013.01); *B01J 19/242* (2013.01); *B01J 19/2405* (2013.01); *B01J 19/2415* (2013.01); *B01J 19/2435* (2013.01); *B01J 19/2475* (2013.01); *C01B 3/501* (2013.01); *F02C 3/22* (2013.01); *F02C 6/18* (2013.01); *H01M 8/0625* (2013.01); *C01B 2203/0233* (2013.01); *C01B 2203/0283* (2013.01); *C01B 2203/041* (2013.01); *C01B 2203/066* (2013.01); *C01B 2203/107* (2013.01); *C01B 2203/1058* (2013.01); *C01B 2203/1064* (2013.01); *F05D 2220/75* (2013.01); *Y02E 50/11* (2013.01); *Y02T 50/678* (2013.01)

(58) Field of Classification Search
CPC combination set(s) only.
See application file for complete search history.

(56) References Cited

U.S. PATENT DOCUMENTS

| | | | |
|---|---|---|---|
| 3,116,344 A | 12/1963 | Deisler | |
| 3,546,891 A | 12/1970 | Fekete | |
| 3,563,883 A * | 2/1971 | Westby et al. | C10G 35/04 |
| | | | 208/63 |
| 3,636,679 A | 1/1972 | Batta | |
| 3,642,430 A | 2/1972 | Benson | |
| 3,948,224 A | 4/1976 | Knapp et al. | |
| 3,956,903 A | 5/1976 | Hiller et al. | |
| 3,977,850 A | 8/1976 | Hill | |
| 4,059,415 A * | 11/1977 | Kosaka | C01B 3/363 |
| | | | 123/3 |
| 4,093,427 A | 6/1978 | Schlenker | |
| 4,235,845 A | 11/1980 | Bose | |

(Continued)

FOREIGN PATENT DOCUMENTS

WO    2012023858    8/2012

OTHER PUBLICATIONS

Alex C. Hoffman, Louis E. Stein, "Gas Cyclones and Swirl Turbines", Published Jan. 1, 2002, 22 pages.

(Continued)

*Primary Examiner* — Kaity Chandler
(74) *Attorney, Agent, or Firm* — John L. Rogitz

(57) ABSTRACT

A reformer assembly for a fuel cell includes a vortex tube receiving heated fuel mixed with steam. A catalyst coats the inner wall of the main tube of the vortex tube and a hydrogen-permeable tube is positioned in the middle of the main tube coaxially with the main tube.

6 Claims, 3 Drawing Sheets

(56) References Cited

U.S. PATENT DOCUMENTS

| | | | |
|---|---|---|---|
| 4,332,224 A | 6/1982 | Latsch et al. |
| 4,392,345 A | 7/1983 | Geary |
| 4,399,107 A | 8/1983 | Bose |
| 4,455,220 A | 6/1984 | Parker et al. |
| 4,482,365 A | 11/1984 | Roach |
| 4,522,159 A | 6/1985 | Engel et al. |
| 4,531,558 A | 7/1985 | Engel et al. |
| 4,606,743 A | 8/1986 | Shuman |
| 4,797,262 A | 1/1989 | Dewitz |
| 4,798,183 A | 1/1989 | Hataura et al. |
| 5,193,341 A | 3/1993 | Sibbertsen et al. |
| 5,391,211 A | 2/1995 | Alliston et al. |
| 5,409,784 A | 4/1995 | Bromberg et al. |
| 5,413,227 A | 5/1995 | Diebold et al. |
| 5,472,463 A | 12/1995 | Herman et al. |
| 5,507,267 A | 4/1996 | Stuer |
| 5,558,069 A | 9/1996 | Stay |
| 6,106,963 A | 8/2000 | Nitta et al. |
| 6,164,308 A | 12/2000 | Butler |
| 6,247,460 B1 | 6/2001 | Lindberg et al. |
| 6,296,820 B1 | 10/2001 | Happrich |
| 6,354,318 B2 | 3/2002 | Butler |
| 6,379,411 B1 | 4/2002 | Turner et al. |
| 6,398,851 B1 | 6/2002 | Bose |
| 6,521,205 B1 | 2/2003 | Beck |
| 6,793,698 B1 * | 9/2004 | Sanger ............... B01J 8/0465 422/200 |
| 6,810,658 B2 | 11/2004 | Kaupert et al. |
| 6,823,833 B2 | 11/2004 | Ismailov |
| 6,843,832 B2 | 1/2005 | Greene et al. |
| 6,851,398 B2 | 2/2005 | Taylor, III et al. |
| 6,932,858 B2 | 8/2005 | Nicol et al. |
| 7,066,973 B1 | 6/2006 | Bentley et al. |
| 7,086,854 B2 | 8/2006 | Rakhmailov et al. |
| 7,191,738 B2 | 3/2007 | Shkolnik |
| 7,220,505 B2 | 5/2007 | Malhotra et al. |
| 7,241,522 B2 | 7/2007 | Moulthrop et al. |
| 7,297,324 B2 | 11/2007 | Tegrotenhuis et al. |
| 7,427,381 B2 * | 9/2008 | Stell ............... B01D 19/0036 422/177 |
| 7,464,540 B2 | 12/2008 | Easley et al. |
| 7,575,610 B2 | 8/2009 | Liu et al. |
| 7,591,242 B2 | 9/2009 | Shih |
| 7,594,941 B2 | 9/2009 | Zheng et al. |
| 7,628,144 B2 | 12/2009 | Vetrovec |
| 7,685,819 B2 | 3/2010 | Vetrovec |
| 7,707,837 B2 | 5/2010 | Inui et al. |
| 7,757,866 B2 | 7/2010 | McCutchen |
| 7,901,485 B2 | 3/2011 | McCutchen |
| 7,909,013 B2 | 3/2011 | Shkolnik et al. |
| 8,070,938 B2 | 12/2011 | Stein et al. |
| 8,078,385 B2 | 12/2011 | Vetrovec |
| 8,210,214 B2 | 7/2012 | Casey et al. |
| 8,216,323 B2 | 7/2012 | Liu et al. |
| 8,220,442 B2 | 7/2012 | Caldwell |
| 8,257,668 B2 | 9/2012 | Mukai et al. |
| 8,303,674 B2 | 11/2012 | Tamura et al. |
| 8,365,699 B2 | 2/2013 | Shkolnik et al. |
| 8,656,720 B1 | 2/2014 | Hardgrave |
| 8,663,369 B2 | 3/2014 | Buhrman et al. |
| 8,667,949 B2 | 3/2014 | Mizuguchi |
| 8,677,949 B2 | 3/2014 | Bromberg et al. |
| 8,715,868 B2 | 5/2014 | Weidner |
| 8,747,496 B2 | 6/2014 | Neels et al. |
| 8,758,459 B2 | 6/2014 | Johnston |
| 8,793,981 B2 | 8/2014 | Li |
| 8,808,425 B2 | 8/2014 | Genkin et al. |
| 8,858,679 B2 | 10/2014 | Buhrman et al. |
| 8,863,723 B2 | 10/2014 | Shkolnik et al. |
| 8,883,360 B2 | 11/2014 | Hong et al. |
| 8,888,899 B2 | 11/2014 | Chan et al. |
| 8,936,769 B2 | 1/2015 | Blevins et al. |
| 8,945,488 B2 | 2/2015 | Bowe et al. |
| 8,961,625 B2 | 2/2015 | Hartvigsen et al. |
| 8,966,879 B1 | 3/2015 | Munson |
| 8,968,432 B2 | 3/2015 | Whyatt et al. |
| 8,968,433 B2 | 3/2015 | Chandran |
| 8,986,631 B2 | 3/2015 | Berggren et al. |
| 8,987,341 B2 | 3/2015 | Early |
| 8,999,020 B2 | 4/2015 | Raman |
| 9,012,098 B2 | 4/2015 | Goto et al. |
| 9,116,528 B2 | 8/2015 | Ukai et al. |
| 9,140,221 B2 | 9/2015 | Foege |
| 9,145,298 B2 | 9/2015 | Volpi et al. |
| 9,156,688 B2 | 10/2015 | Hyde et al. |
| 9,169,118 B1 | 10/2015 | Bossard |
| 9,169,778 B2 | 10/2015 | Allam |
| 9,266,732 B2 | 2/2016 | Park et al. |
| 2001/0011556 A1 | 8/2001 | Butler |
| 2002/0095916 A1 | 7/2002 | Turner et al. |
| 2002/0194992 A1 | 12/2002 | Greene et al. |
| 2004/0013923 A1 | 1/2004 | Molter et al. |
| 2004/0099614 A1 | 5/2004 | Lehmann et al. |
| 2005/0045033 A1 | 3/2005 | Nicol et al. |
| 2005/0166869 A1 | 8/2005 | Shkolnik |
| 2006/0013759 A1 | 1/2006 | Jiang et al. |
| 2006/0084022 A1 | 4/2006 | Kruger |
| 2006/0135630 A1 | 6/2006 | Bowe |
| 2007/0125346 A1 | 6/2007 | Vetrovec |
| 2007/0137590 A1 | 6/2007 | Vetrovec |
| 2007/0277506 A1 | 12/2007 | Easley et al. |
| 2008/0047239 A1 | 2/2008 | Zheng et al. |
| 2008/0133110 A1 | 6/2008 | Vetrovec |
| 2008/0141973 A1 | 6/2008 | Shkolnik et al. |
| 2008/0251419 A1 | 10/2008 | Stein et al. |
| 2009/0013867 A1 | 1/2009 | McCutchen |
| 2009/0022465 A1 | 1/2009 | Chen et al. |
| 2009/0060805 A1 * | 3/2009 | Muradov ............... B01J 8/12 422/186.04 |
| 2009/0165887 A1 | 7/2009 | Casey et al. |
| 2009/0259388 A1 | 10/2009 | Vetrovec |
| 2010/0132153 A1 | 6/2010 | Leibold et al. |
| 2011/0056457 A1 | 3/2011 | Livshits et al. |
| 2011/0114057 A1 | 5/2011 | Shkolnik et al. |
| 2011/0212090 A1 | 9/2011 | Pedersen et al. |
| 2011/0219948 A1 | 9/2011 | McCutchen |
| 2011/0229834 A1 | 9/2011 | Salansky et al. |
| 2011/0296869 A1 | 12/2011 | Buhrman et al. |
| 2011/0296986 A1 | 12/2011 | Buhrman et al. |
| 2012/0034135 A1 | 2/2012 | Risby |
| 2012/0067214 A1 | 3/2012 | Salcedo |
| 2012/0111994 A1 | 5/2012 | Kummer et al. |
| 2012/0125300 A1 | 5/2012 | Caldwell |
| 2012/0216915 A1 | 8/2012 | Takata et al. |
| 2013/0041049 A1 | 2/2013 | Bowe et al. |
| 2013/0067905 A1 | 3/2013 | Eckert |
| 2013/0086884 A1 | 4/2013 | Michaels-Christopher |
| 2013/0139785 A1 | 6/2013 | Shkolnik et al. |
| 2014/0130756 A1 | 5/2014 | McAlister |
| 2014/0150753 A1 | 6/2014 | Foege |
| 2014/0166539 A1 | 6/2014 | Balepin et al. |
| 2014/0170038 A1 | 6/2014 | Fischer et al. |
| 2014/0190588 A1 | 7/2014 | Sloan et al. |
| 2014/0208703 A1 | 7/2014 | Willems et al. |
| 2015/0024297 A1 * | 1/2015 | Finnerty ............... B01J 19/006 429/423 |
| 2015/0110609 A1 | 4/2015 | Shkolnik et al. |
| 2015/0119478 A1 | 4/2015 | Bowe et al. |
| 2015/0144841 A1 * | 5/2015 | Finnerty ............ H01M 8/0618 252/373 |
| 2015/0159284 A1 | 6/2015 | Packer |
| 2015/0252757 A1 | 9/2015 | McAlister |
| 2015/0291887 A1 | 10/2015 | Coetzee et al. |
| 2016/0045841 A1 | 2/2016 | Kaplan et al. |
| 2016/0254557 A1 * | 9/2016 | Finnerty ............... B01J 12/007 429/423 |

OTHER PUBLICATIONS

Catherine E. Gregoire Padro, Francis Lau, "Advances in Hydrogen Energy", Jan. 1, 2000, 201 pages.

Ceramatec, "Hydrogen Separation/ Purification" printed Jan. 8, 2015, http://www.ceramatec.com/technology/ceramic-solid-state-

(56) References Cited

OTHER PUBLICATIONS ionic-technologies/separation-&-purification-technologies/hydrogen.php.
Kevin T. Raterman, Michael Mckellar, Ana Podgorney, Douglas Stacey, Terry Turner, Brian Stokes, John Vranicar, "A Vortex Contractor for Carbon Dioxide Separations", Published May 1, 2001.
Yue Li, Qi Fu, Maria Flytzani-Stephanopoulos, "Low-Temperature Water-Gas Shift Reaction Over Cu-and Ni-Loaded Cerium Oxide Catalysts", Elservier, Applied Catalysis B: Environmental 27 (2000) 179-191.
Vortex Tube Hydrogen Reformer—Google Search, printed from web Apr. 28, 2016. https://www.google.com/search?q=vortex+tube+hydrogen+reformer&sa=X&biw=1536&bih=706&tbm=isch&imgil=uGLmriZoHEt17M%253A%253Bc12E_P7-Kw8jUM%253Bhttps%25253A%25252F%25252Fhydrogen.wsu.edu%25252Fh2refuel%25252Fdesign%25252F&source=iu&pf=m&fir=uGLmriZoHEt17M%253A%252Cc12E_P7-Kw8jUM%252C_&usg=_I8nBmM1j77Yjb0AnxJyNGIOdIGw%.
Jacob Leachman, "Kinetic Orthohydrogen-parahydrogen separation to enable small-modular hydrogen liquefaction", Concept Paper DE-FOA-0001002, printed Apr. 28, 2016.
Upendra Behera, P.J. Paul, K. Dinesh, S. Jacob, "Numerical investigations on flow behaviour and energy separation in Ranque-Hilsch vortex tube" International Journal of Heat and Mass Transfer 51 (2008) 6077-6089.
Tanvir Farouk, Bakhtier, Farouk, Alexander Gustol, "Simulation of gas species and temperature separation in the counter-flow Ranque-Hilsch vortex tube using the large eddy simulation technique", International Journal of Heat and Mass Transfer 52 (2009) 3320-3333.
Sam Wong and Rob Bioletti, "Carbon Dioxide Separation Technologies" Carbon & Energy Management Alberta Research Council, http://www.aidis.org.br/PDF/CARBON%20DIOXIDE%20SEPARATION%20TECHNOLOGIES.pdf, obtained Apr. 14, 2015.
"The Vortex-Tube as a Tool in Sustainable Energy Production", STW.nl, Project No. 10538, 2 pages, http://www.stw.nl/nl/content/vortex-tube-tool-sustainable-energy-production, obtained Mar. 11, 2015.
Pongjet Promvonge and Smith Elamsa-Ard, "Invesigation on the Vortex Thermal Separation in a Vortex Tube Refrigerator", obtained Apr. 14, 2015.
David McCutchen, "Vorsana Radial Counterflow Solutions, Vorsana Gas Scrubber", obtained Apr. 14, 2015.
"Vorsana—Radial Counterflow Solutions, Post-Combustion Carbon Dioxide Capture", http://www.vorsana.com/co2andairpollution/carboncapture.html, dated Mar. 11, 2015.
"Vorsana Shear Retort", Vorsana Radial Counterflow Solutions, obtained Apr. 14, 2015.
"Vorsana TriPhase Filter", Vorsana Radial Counterflow Solutions, obtained Apr. 14, 2015.
"Vorsana Scrubber", Vorsana Radial Counterflow Solutions, obtained Apr. 14, 2015.
Eltron Research & Development, "High Temperature, Hydrogen Separation A Carbon Capture Process Technology", Program Overview Feb. 2011.
Eltron Reserach & Development, "Tech Brief Maximum, Economical CO2 Capture for IGCC Power Plants" technology Readiness Level:4 Component and/or Breadboard Validation in Laboratory Environment, obtained Apr. 14, 2015.
Doe Hydrogen and Fuel Cells Program, "II.0 Hydrogen Production Sub-Program Overview", FY 2014 Annual Progress Report, II-3-II-10, obtained Apr. 14, 2015.
G.Q.Lu, J.C.Diniz Da Costa, M. Duke, S. Giessler, R. Socolow, R.H. Williams, T. Kreutz, "Inorganic membranes for hydrogen production and purification: A critical review and perspective", Journal of Colloid and Interface Science 314 (2007) 589-603.
William D. Jones and Frank J. Feher, "Comparative Reactivities of Hydrocarbon C—H Bonds with a Transition-Metal Complex", Acc. Chem. Res. 1989, 22, 91-100.
Jian-Rong Li, Yuguang Ma, M. Colin McCarthy, Julian Sculley, Jiamei Yu, Hae-Kwon Jeong, Perla B. Balbuean, Hong-Cai Zhou, "Carbon dioxide capture-related gas adsorption and separation in metal-organic frameworks" Coordination Chemistry Reviews 255 (2011) 1791-1823.
Jean-Yves Saillard and Roald Hoffmann, "C—H and H—H Activation in Transition Metal Complexes and on Surfaces" J. Am. Chem. Soc. 1984, 106, 2006-2026.
Air Products Advanced Prism Membrane Systms for Cost Effective Gas Separations Prism Separtors brochure obtained Apr. 14, 2015.
Air Products Presentation, obtained Apr. 14, 2015.
PALL Pall Corporation, Gas Separation Membrane; obtained Apr. 14, 2015.
Ashok Damle, Jim Acquaviva, PALL Corporation, "Membrane Reactor for Hydrogen Production" AIChE 2008 Annual Meeting, Philadelphia, PA; Nov. 17, 2008.
Scott Hopkins, Matthew Keeling, Chuck Love, Keith Rekczis, Kevin Stark and Ashok Damle, "Pall Corporation, Commercialization of Pd Alloy Composite Membranes for Small Scale Hydrogen Generation, Fuel Cell Seminar 2011", Nov. 3, 2011.
Christian P. Canlas, Junling Lu, Natalie A. Ray, Nicolas A. Grosso-Giordano, Sungsik Lee, Jeffrey W. Elam, Randall E. Winans, Richard P. Van Duyne, Peter C. Stair, Justing M. Notestein, "Shape-selective sieving layers on an oxide catalyst surface", Nature Chemistry 4, 1030-1036, Nov. 9, 2012.
J.W. Phair, S.P.S. Badwal, "Materials for separation membranes in hydrogen and oxygen production and future power generation" ScienceDirect Science and Technology of Advanced Material 7 (2006) 792-805.
S.M. Saufi, A.F. Ismail, "Fabrication of carbon membranes for gas separation—a review" Science Direct, Carbon 42 (2004) 241-259.
Doe Hydrogen and Fuel Cells Program, FY 2012 Annual Progress Report, "II.C.2 Process Intensification of Hydrogen Unit Operations Using and Electrochemical Device" obtained Apr. 14, 2015.
Christina Myers, Henry Pennline, David Luebke, Jeffrey Ilonich, Janeille K. Dixon, Edward J. Maginn, Joan F. Brennecke, "High temperature separation of carbon dioxide/hydrogen mixtures using facilitated supported ionic liquid membranes" Journal of Membrane Science 322 (2008) 28-31.
Andres Mahecha-Botero, Tony Boyd, Ali Gulamhusein, Nicholas Comyn, C. Jim Lim, John R. Grace, Yoshinori Shirasaki, Ismu Yasuda, "Pure hydrogen generation in a fluidized-bed membrane reactor Experimental findings" Chemical Engineering Science 63 (2008) 2752-2762.
Arian Nijmeijer, "hYDROGEN-Selective Silica Membranes for Use in Membrane Steam Reforming" Thesis University of Twente, Enchede The Netherlands 1999.
Ke Liu, Chunshan Song, Velu Subramani, "Hydrogen and Syngas Production and Purification Technologies" 2010 American Institute of Chemical Engineers.
Robert Hotto, "Vortex Tube Reformer for Hydrogen Production, Separation, and Integrated Use" file history of related pending U.S. Appl. No. 15/078,263, filed Mar. 23, 2016.

* cited by examiner

INTEGRATED REFORMER AND SYNGAS SEPARATOR

TECHNICAL FIELD

The present invention relates generally to hydrocarbon reformers and syngas separators for fuel cell-based energy production, systems and petrochemical processing.

BACKGROUND

Fuel cells produce electricity by processing hydrogen or hydrocarbon-based teed, often a mixture of hydrogen and carbon monoxide referred to as "syngas". The syngas is produced by reforming hydrocarbon fuels such as natural gas or diesel fuel. Reforming entails breaking the hydrocarbon chemical bonds, leaving a mixture of separate carbon-based molecules and hydrogen molecules. In any case, many fuel cell-based energy production systems use reformer assemblies to produce the syngas required as input to the fuel cell.

As understood in the present assignee's U.S. Pat. No. 7,818,969, incorporated herein by reference, the life and operational flexibility of fuel cells can be extended by providing only the hydrogen to the fuel cells, diverting the carbon-based products of the reformer assembly elsewhere, e.g., into a turbine or internal combustion energy. Such separation of the syngas components may be accomplished using membrane separation technology. Present principles are directed to a novel reformer assembly which both reforms hydrocarbon-based fuel and separates hydrogen from carbon-based constituents.

SUMMARY

Accordingly, a reformer assembly includes at least one vortex tube with a swirl chamber having an input and a main tube segment communicating with the swirl chamber and having a first output juxtaposed with an inside surface of a wall of the main tube segment. The first output is for outputting relatively hotter and heavier constituents of the gas provided at the input. At least one catalytic constituent is on the inside surface of the wall of the main tube segment. Also, at least one hydrogen-permeable tube can be disposed centrally in the main tube segment and defines a second output at one end of the hydrogen-permeable tube for outputting at least one relatively lighter and cooler constituent of fluid provided at the input.

In example, the relatively lighter and cooler constituent includes hydrogen, while the relatively hotter and heavier constituents of the gas provided at the input include carbon.

If desired, the catalytic constituent can include nickel and/or platinum and/or rhodium and/or palladium and/or gold.

In some examples a fuel cell is connected to the second output.

In some examples an engine connected to the first output. The engine can be, e.g., an internal combustion engine or a turbine.

In an embodiment, plural vortex tubes are arranged in a toroidal configuration, with a first vortex lube in the plural vortex tubes defining the input and providing gas from the respective second output to an input of a next vortex tube in the plural vortex tubes.

In one configuration the lighter gas output is the input to the next vortex tube and in another configuration the heavier gas is the input to the next vortex tube input.

In some examples, a fuel reservoir may be provided for providing hydrocarbon fuel to the vortex tube. The example fuel reservoir may be configured for receiving an exhaust of an engine to heat fuel within the fuel reservoir.

In some examples, a steam reservoir may be provided for providing steam to the vortex tube, with the steam reservoir configured for receiving an exhaust of an engine to heat fluid within the steam reservoir. Also or in addition, the steam reservoir may be configured for receiving steam from the fuel cell.

A water gas shift reactor may be provided for receiving fluid from the second output of the vortex tube.

In another aspect, a system includes a fuel cell and at least one vortex tube assembly for receiving hydrocarbon fuel as input and providing hydrogen reformed and separated from the hydrocarbon fuel within the vortex tube to the fuel cell.

In another aspect, a method includes reforming hydrocarbon fuel using at least one vortex tube, and separating hydrogen from carbon-based constituents during the reforming. The method also includes providing the hydrogen to at least one fuel cell.

The details of the present description, both as to its structure and operation, can best be understood in reference to the accompanying drawings, in which like reference numerals refer to like parts, and in which:

DETAILED DESCRIPTION

Figure 1:
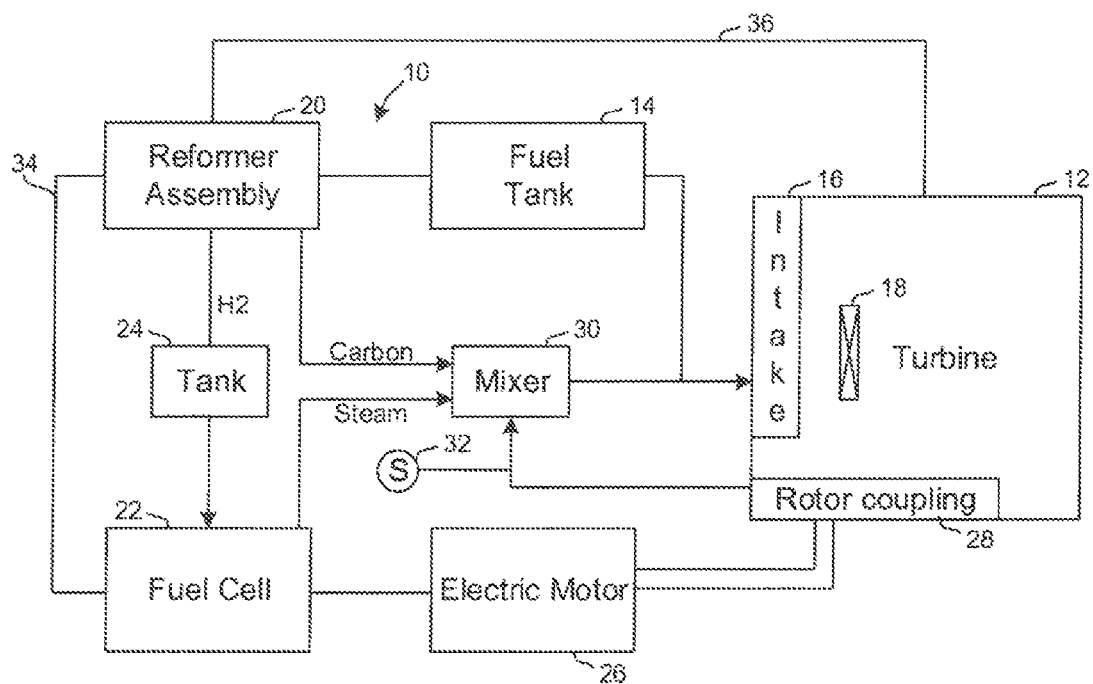
FIG. 1 is a block diagram of an example energy generation system.

FIG. 1 shows an actuation system 10, described further below, that in one example imparts energy to a receiver, such as an internal combustion engine for a vehicle or in the example shown by imparting torque to a rotor of a turbine 12 to rotate an output shaft of the turbine. The turbine 12 may include a compressor section, a combustion section, and a turbine section in accordance with turbine principles and may also have one or more rotors or shafts which typically are coupled to each other and which may be concentric to each other.

FIG. 1 shows that in one implementation, a fuel tank 14 which contains hydrocarbon-based fuel such as but not limited to jet fuel can provide fuel to an intake 16 of the turbine 12. The fuel typically is injected through injectors in the turbine, where it mixes with air compressed by the compressor section of the turbine and ignited in a so-called "flame holder" or "can". "Intake" refers generally to these portions of the turbine that are preliminary to the turbine blades. The high-pressure mixture is then directed to impinge on turbine blades 18 which are coupled to the output shaft. In this way torque is imparted to the output shaft to cause it to rotate about its axis. In other implementations the turbine 12 need not be a combustion turbine, and as alluded to above other receivers such as internal combustion engines in vehicles may be used.

The output shaft of the turbine can be coupled to the rotor of an electrical generator to rotate the generator rotor within an electric field and thus cause the generator to output electricity. Or, the output shaft of the turbine may be coupled to the rotor of an aircraft fan to rotate the fan and thus cause it to generate thrust for propelling a turbofan jet plane. Yet again, the output shaft of the turbine may be coupled to the rotor of a propulsion component such as the rotor of a helicopter, the shaft of a watercraft on which a propeller is mounted, or a drive shaft of a land vehicle such as a military tank to rotate the rotor/shaft/drive shaft as the case may be to propel the platform through the air or water or over land, depending on the nature of the conveyance. The propulsion component may include a drive train that can include a combination of components known in the art, e.g., crankshafts, transmissions, axles, and so on.

In addition to or in lieu of actuating a receiver such as the turbine 12 with feel directly from the fuel tank 14, the actuation system 10 may include a reformer assembly 20 which receives fuel from the fuel tank 14. While some embodiments of the reformer assembly may include a reformer and a membrane-type hydrogen separator to separate hydrogen in the reformed product of the reformer from the carbon-based constituents, a vortex tube-based reformer assembly is described further below.

The reformer assembly 20 produces hydrogen from the fuel, and the hydrogen is sent to a fuel cell 22, in some cases through a hydrogen tank 24 first as shown. If desired, multiple reformers and/or fuel cells may be used in parallel with each other.

The fuel cell 22 uses the hydrogen to generate electricity, typically with a relatively high efficiency, by oxidizing the hydrogen with oxygen from, e.g., the ambient atmosphere. Without limitation, the feel cell 22 may be a polymer exchange membrane fuel cell (PEMFC), a solid oxide fuel cell (SOFC), an alkaline fuel cell (AFC), a molten-carbonate fuel cell (MCFC), a phosphoric-acid fuel cell (PAFC), or a direct-methanol feel cell (DMFC).

In turn, electricity from the fuel cell 22 may be sent to an electric motor 26 to cause an output shaft of the motor 26 to turn. The motor shaft is mechanically coupled through a rotor coupling 28 to a rotor of the turbine 12. Typically, the turbine rotor to which the motor 26 is coupled is not the same segment of rotor bearing the blades 18, although in some implementations this can be the case. Instead, the turbine rotor to which the motor 26 may be coupled may be a segment of the blade rotor that does not bear blades or a rotor separate from the blade rotor and concentric therewith or otherwise coupled thereto. In any case, the motor 26, when energized by the fuel cell 22, imparts torque (through appropriate couplings if desired) through a turbine rotor to the output shaft of the turbine 12, which in some cases may be the same shaft as that establishing the turbine rotor. Power from the motor 26 may be provided to components other than the receiver embodied by the turbine. Yet again, the electrical power produced by the fuel cell may be sent to electrical storage, such as a battery system, or to the electrical distribution grid of a municipality.

In addition, to realize further efficiencies, output of the fuel cell such as water in the form of steam produced by the fuel cell 22 may be mixed with hydrocarbon from the reformer assembly 20 in a mixer 30, which may be a tank or simple pipe or other void in which the water and carbon can mix, with the mixture then being directed (through, e.g., appropriate piping or ducting) to the turbine intake 16. If desired, surfactant from a surfactant tank 32 may also be added to the steam/carbon mixture. Or, the steam from the fuel cell may be sent to the reformer assembly described below without mixing the steam with carbon and/or without mixing the steam with surfactant.

In any case, it may now be appreciated that the steam/carbon mixture may supplement fuel injection, directly from the fuel tank 14 to the turbine intake 16, or replace altogether fuel injection directly from the fuel tank 14 to the turbine intake 16.

Still further, electricity produced by the fuel cell 22 may fee used not only to actuate the electric motor 26 (or provide power to a battery storage or the grid) but also to provide ignition current, for the appropriate components in the turbine or engine 12. Also, electricity from the fuel cell may be used for other auxiliary purposes, e.g., in addition to actuating the electric motor, powering other electrical appliances. In cases where the reformer assembly 20 generates carbon dioxide and steam, these fluids may also be directed to the intake 16 of the turbine directly from the reformer assembly 20 or through the mixer 30.

In some embodiments, water can be returned from the fuel cell 22 if desired to the reformer assembly 20 through a water line 34. Also if desired, heat from the receiver (e.g., from the turbine 12) may be collected and routed back to the reformer assembly 20 through ducting/piping 36, to heat the reformer assembly.

Figure 2:
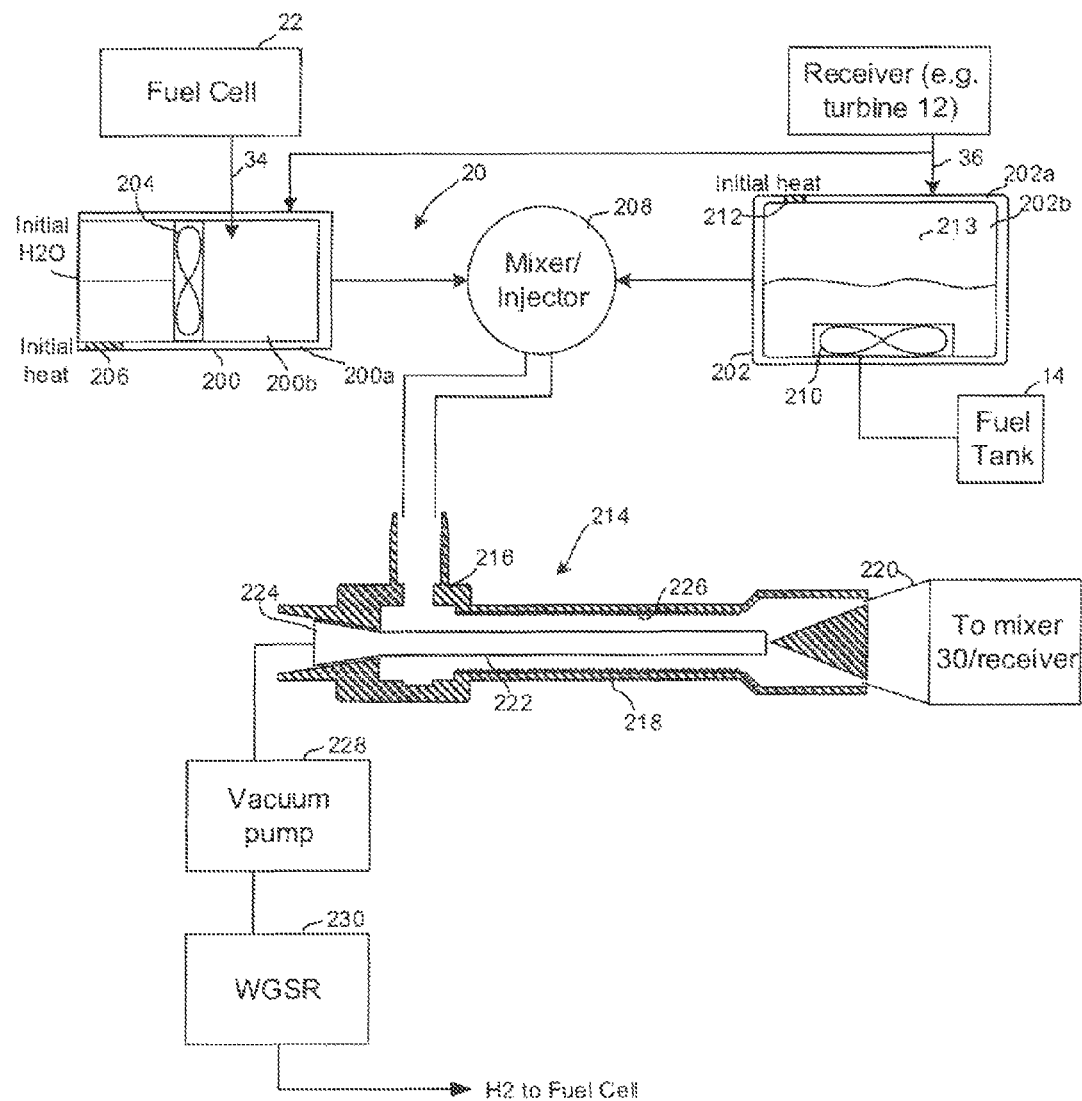
FIG. 2 is a block diagram of an example vortex tube reformer/separator assembly.

FIG. 2 illustrates a vortex tube-based reformer assembly 20. As shown, the assembly 20 may include a steam reservoir 200 and a fuel reservoir 202. The steam reservoir 200 and fuel reservoir 202 may be heat exchangers, schematically depicted by illustrating a respective outer heating chamber 200a, 202a surrounding a respective inner fluid chamber 200b, 202b, with the heat in each outer heat exchange chamber heating the fluid in the respective inner fluid chamber. Heat may be supplied to each heat exchange chamber 200a, 202a via the exhaust line 36 from the exhaust of the receiver of FIG. 1, e.g., the turbine 12.

First considering the steam reservoir 200, initial water or steam for startup may be supplied to the intake side of an optional impeller 204 or other fluid movement device until such time as the Initial water or steam may be supplemented and preferably superseded by steam exhaust from the fuel cell 22 via the line 34 as shown, initial startup heat may also be provided, e.g., from an electric heating element 206 in the heat exchange chamber 200a of the fluid reservoir 200, from exhaust heat from the turbine or engine, or from some other source of heat until such time as the startup heat may be supplemented and preferably superseded by exhaust heat from the receiver (e.g., turbine 12) via the exhaust line 36 as shown. In any case, the initial water heated into steam for startup and the steam from the fuel cell during operation are sent to a mixer/injector reservoir 208, under the influence of the impeller 204 when provided or simply under steam pressure within the inner fluid chamber 200b.

With respect to the fuel reservoir 202, hydrocarbon fuel such as but not limited to natural gas may be supplied from the fuel tank 14 to the intake side of an optional impeller 210 or other fluid movement device. Initial startup heat may also be provided, e.g., from an electric heating element 212 in the heat exchange chamber 202a of the fuel reservoir 202 or from some other source of heat until such time as the startup heat may be supplemented and preferably superseded by exhaust heat from the receiver (e.g., turbine 12) via the exhaust line 36 as shown. In any case, the heated fuel in the fluid chamber 202b of the fuel reservoir 202, preferably scrubbed of sulfur by desulfurizer sorbent elements 213 that may be provided on the inside wall of the fuel chamber, is sent to the mixer/injector reservoir 208, under the influence of the impeller 210 when provided or simply under fluid pressure within the inner fluid chamber 202b. In some case, the fuel may not be heated prior to provision to the mixer/injector 208.

In some examples, the steam in the steam reservoir 200 and/or fuel in the fuel, reservoir 202 may be heated to six hundred degrees Celsius (600° C.) to one thousand one hundred degrees Celsius (1100° C.) at a pressure of three atmospheres to thirty atmospheres (3 atm-30 atm). More generally, the reaction temperatures applied to the hydrocarbon and steam mixtures can proceed from, a low temperature of 300 C up to 1200 C. These temperatures can be optimized for the input hydrocarbon feed type, the duty transit time of the process through the reaction tube, and the applied pressures caused by the turbulent flow such the vortex generated in the reaction tube.

The mixer/injector 208 mixes the steam from the steam reservoir 200 with the fuel from the fuel reservoir 202. The mixing may be accomplished under the influence of the turbidity of the respective fluids as they enter the mixer/injector 208 and/or by additional mixing components such as rotating impellers within the mixer/injector 208 and/or by other suitable means. The mixer/injector 208 injects the mixed steam and fuel into a vortex tube 214, e.g., through fuel injectors or simply through a port and fluid line under the influence of fluid pressure within the mixer.

The vortex tube 214, which also may be known as a Ranque-Hilsch vortex tube, is a mechanical device that separates a compressed fluid into hot and cold streams. It typically has no moving parts.

As shown, the pressurized mixture of steam and fuel from the mixer/injector 208 is injected, preferably tangentially, into a swirl chamber 216 of the vortex tube 214, and accelerated to a high rate of rotation by the cooperation of geometry between the swirl chamber 216 and cylindrical wall of a main tube segment 218 that is oriented perpendicular to the input axis of the swirl chamber 216 as shown. A first conical nozzle 220 may be provided at one end of the vortex tube 214 so that only the outer shell of the compressed gas is allowed to escape at that end. The remainder of the gas is forced to return back through the main inner tube 218 toward the swirl chamber 216 in an inner vortex of reduced diameter that is substantially coaxial with the main tube segment 218 as shown. In one embodiment, the inner vortex can be enclosed in a hydrogen-permeable tube 222 that leads to a hydrogen output 224, which may be established by a second conical nozzle. The hydrogen-permeable tube 222, when provided, preferably is impermeable to carbon-based constituents. The tube 222 may include Palladium.

A catalyzing layer 226 may be formed on or made integral with the inside surface of at least the main inner tube 218 to attract carbon-based constituents to the outer circumference of the passageway formed by the main inner tube. The catalyzing layer may include nickel and/or platinum and/or rhodium and/or palladium and/or gold. The tube 218 may be composed of the catalyzing layer or the layer 226 may be added to a tube substrate as by, e.g., vapor deposition of the catalyzing layer 226 onto the tubs substrate, which may be ceramic.

The cooperation of structure of the vortex tube 214 forces relatively cooler hydrogen from the input fuel toward the axis of the main tube 218 into the hydrogen-permeable tube 222 when, provided, and left looking down at FIG. 2 along the axis of the main tube 218, while forcing the relatively heavier and hotter carbon-based constituents of the fuel outward against the catalytic layer 226 and right looking down at FIG. 2. Owing to the cooperation of structure depicted, the fuel is both chemically reformed into hydrogen and carbon-based constituents and the hydrogen is physically separated from the carbon-based constituents for provisioning to the fuel cell 22.

If desired, an evacuation mechanism such as a vacuum pump 228 may be provided to aid in withdrawing hydrogen from the hydrogen output 224 of the vortex tube 214. Also, if desired the hydrogen may be passed through a water gas shift reactor (WSGR) 230 to further purify the hydrogen, prior to provisioning to the feel cell 22.

On the other hand, the carbon-based constituents of the fuel are sent out of the right side of the main tube 218 of the vortex tube 214 to the receiver, e.g., the turbine 12, in some cases via the mixer 30 shown in FIG. 1.

Fuel cells typically work better when the hydrogen input to them is relatively cooler than that produced by conventional reformers, which consequently may require cooling. Moreover, it may be difficult to employ certain hydrogen cooling techniques such as WGSR with extremely high temperature hydrogen from a conventional reformer, meaning the hydrogen may require significant cooling. By reforming the fuel, separating the hydrogen, and cooling the hydrogen (relative to the carbon-basal constituents) in a single reformer assembly as described herein, multiple benefits accrue, including the ability to produce relatively cool hydrogen which requires less post-reforming cooling and which extends the life of the fuel cell.

Accordingly, the application of vortex or cyclonic swirling action enables the elegant integration of these processes and provides higher energy efficiency, improved fuel utilization, and increased hydrogen yield. Additional advantages over conventional reformers include shifting of the chemical equilibrium to favor hydrogen production. This is achieved by the placement of a hydrogen permeable membrane separator tube at the low-pressure site of the vortex to pull or harvest hydrogen from the evolving hydrocarbon syngas mixture during the reforming process in the tube. This process is achieved through the combination of a generated vortex or vortexes, which enhances the reforming and vortex gas separation simultaneously while also enhancing the harvesting and cooling of the hydrogen gas.

In the approach described above, the generated vortex provides centrifugal spinning action which is applied to the gases in a circular tube, initially to the hydrocarbon and steam, which tangentially presses at higher pressures and temperatures against the walls of the catalyst-lined main tube 218, enhancing the rate of reforming. This is due to the higher temperatures and pressures on the on the more massive molecular gases (the hydrocarbons and steam) imposed by the swirling motion contacting the walls of the catalyst lined tube.

As the reforming process proceeds down the tube in the vortex, the input hydrocarbon gas mixture differentiates or stratifies axially in the tube according to gas densities. The hydrocarbons and the steam being the densest congregate at the inside wall of the tube and the hydrogen having the lowest density will move towards the center of the vortex. The higher momentums are imparted to the heavier gases, the longest chain hydrocarbons and the steam, which collide with high force and in high densities with the catalyst-lined wall of the tube. This optimizes compliance and the interface between the hydrocarbon, the steam and the catalyst for a given pressure.

The hydrogen gases, which are less massive, are pulled toward the center of the vortex, toward the lower pressure zone, away from the peripheral. This effect, moving the hydrogen away from the peripheral, improves the access path to the catalyst for the heavier hydrocarbons, steam, and carbon oxides. The center of the tube, where the vortex has its lowest pressures, contains the hydrogen permeable filter tube 222 with suction for pulling hydrogen. Therefore hydrogen permeates in to the center and is drawn off from the reaction with a negative pressure, thereby harvesting the hydrogen while the reforming process proceeds.

The hydrogen is separated and drawn to the center of the vortex due to its lower density and it is further drawn into the waifs of the hydrogen permeable separation tube due to the negative pressure applied to the tube. The drawing off or harvesting of hydrogen from the ongoing reforming further improves the dynamic chemical reactions in conjunction with catalyst by depleting hydrogen, limiting unfavorable hydrogen reversible reactions. This increases the hydrogen to carbon production ratio.

With the above in mind, the product of the reformation reaction (syngas) is continually tapped during the transit time along the vortex tube providing the purified output streams and further changing the equilibrium balance of the ongoing reaction to improve the amount of hydrogen produced. The vortex cyclonic action may be applied to the injected hydrocarbon and steam feeds by means of propeller, or pump which a causes the heavy hydrocarbon base gases and steam towards the tube walls. This action causes reforming of some of the hydrocarbons impinging on the catalysts, ejecting hydrogen and carbon monoxide. These two gases being lighter than the CH4 are propelled towards the center of the vortex away from the wall of the vortex tube. The separated output streams consisting of hydrogen on the one hand and steam, carbon monoxide, carbon dioxide, and trace impurities on the other are individually tapped and fed to respective output streams.

The production and the separation of the output fuels streams are both enhanced by means of the vortex action in the reaction tube and the progressive removal of the fractional products, such as hydrogen, which further provides dynamic optimization due to the continuous non equilibrium conditions.

In addition to appropriate sensors, valves, and controller electronics, the vortex tube may include fuel and steam injectors, heating inputs, heat exchangers, high shear turbulent mixers, internal filters, and output stream taps. The output hydrogen and some steam can be fed to the fuel cell 22, with carbon-based constituents and some steam being fed to the receiver. In some implementations most of the steam and heaver fractional hydrocarbons can be fed back into the vortex tube or a plurality of vortex tubes.

Figure 3:
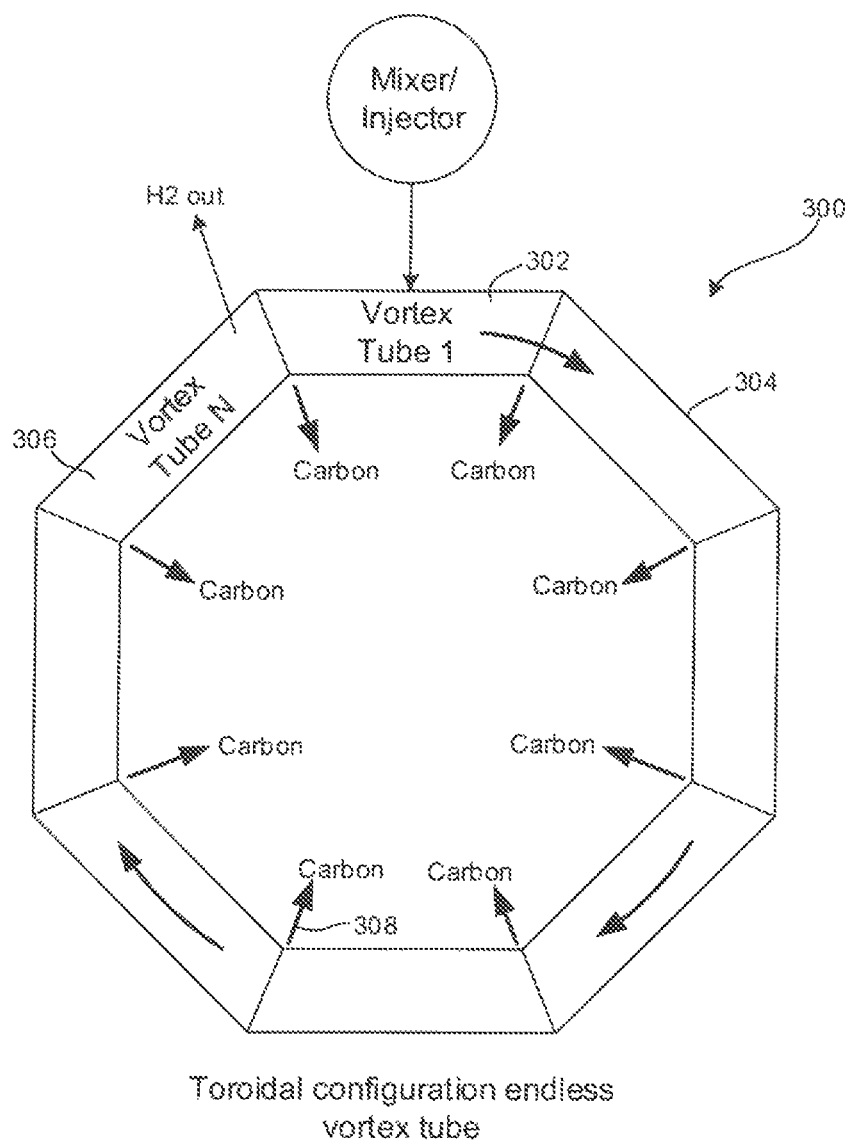
FIG. 3 is a schematic diagram of a toroidal vortex tube assembly.

FIG. 3 illustrates an embodiment in which plural vortex tubes are arranged in an endless loop 300, referred to herein as a "toroidal" configuration without implying that the endless loop is perfectly round. Each vortex tube may be substantially identical in construction and operation to the vortex tube 214 in FIG. 2.

As shown, fuel may be input to an initial vortex tube 302, the hydrogen output from the hydrogen permeable tube of which is sent as input to the swirl chamber of the next vortex tube 304, whose hydrogen output in turn is provided as input to the next vortex tube. "N" vortex tubes may this be arranged in series in the configuration 300, with "N" being an integer (in the example shown, N=8) and with the hydrogen output of the $N^{th}$ vortex tube 306 being sent to the fuel cell 22. In this way, the hydrogen is successively separated into ever-more-pure input for the fuel cell, while the carbon-based constituents output from each vortex tube can be individually withdrawn from each tube and sent to the receiver, as indicated by the "N" arrows 308.

The configuration 300 of FIG. 3 may be used in the system shown in FIG. 2, with the initial vortex tube 302 receiving fuel from the mixer/Injector 208 and sending hydrogen from the hydrogen output 224 to the swirl chamber input of the next vortex tube, and with the hydrogen output of the $N^{th}$ vortex tube 306 being sent to the fuel cell 22 via the vacuum pump 228 and WSGR 230. Carbon-based constituents from each vortex tube of FIG. 3 may be sent to the mixer/receiver 30/12.

In other embodiments, the carbon output of each tube is sent to the input of the next tube with the hydrogen outputs of each tube being individually directed out of the toroidal configuration 300 and sent to the fuel cell.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

While the particular INTEGRATED REFORMER AND SYNGAS SEPARATOR is herein shown and described in detail, the scope of the present application is limited only by the appended claims.

What is claimed is:

1. System comprising:
   at least one fuel cell;
   a mixer connected to a steam reservoir and to a fuel reservoir; and
   at least one vortex tube assembly configured to receive a steam/hydrocarbon mixture from the mixer and to generate hydrogen by reforming the hydrocarbon in the steam/hydrocarbon mixture within the vortex tube, and to provide the hydrogen to the fuel cell, wherein the vortex tube assembly comprises:
   a swirl chamber and a cylindrical main tube segment, the swirl chamber receiving the steam/hydrocarbon mixture and communicating the steam/hydrocarbon mixture to an input of the main tube segment, the swirl chamber defining an input axis along which the steam/hydrocarbon mixture flows, the steam/hydrocarbon mixture entering the main tube segment tangentially, the main tube segment defining a tube axis, the input axis of the swirl chamber not being parallel to the tube axis, the main tube segment having a first output juxtaposed with an inside surface of a wall of the main tube segment, the first output outputting relatively hotter and heavier constituents of the steam/hydrocarbon mixture provided at the input of the main tube segment, the vortex tube defining a second output opening opposite the first output, the steam/hydrocarbon input from the swirl chamber into the main tube segment being positioned between the first and the second outputs of the main tube segment; and
   at least one catalytic constituent on the inside surface of the wall of the main tube segment.

2. The system of claim 1, wherein the vortex tube assembly comprises:
   at least one conical nozzle disposed at the first output and flaring outwardly therefrom, the configuration of the nozzle allowing only an outer shell of compressed gas impinging on the nozzle to escape at the second output.

3. The system of claim 1, comprising:
   at least one hydrogen-permeable tube disposed centrally in the main tube segment and defining the second output at one end of the hydrogen-permeable tube for outputting at least one relatively lighter and cooler constituent of hydrocarbon provided at the hydrocarbon input.

4. The system of claim 1, comprising:

plural vortex tubes arranged in a toroidal configuration, a first vortex tube in the plural vortex tubes defining the input and providing fluid from a respective second output to an input of a next vortex tube in the plural vortex tubes.

5. The system of claim 1, comprising a water gas shift reactor for receiving, at an output of the vortex tube, lighter and cooler constituents of fluid provided at an input of the vortex tube.

6. The system of claim 1, wherein the input of the main tube segment receiving the steam/hydrocarbon mixture from the swirl chamber is at an end of the main tube segment.

* * * * *